(12) United States Patent
Walsh et al.

(10) Patent No.: US 9,497,326 B1
(45) Date of Patent: Nov. 15, 2016

(54) SYSTEM AND METHOD FOR VOICEMAIL ACCELERATION

(71) Applicant: Interactive Intelligence Group, Inc., Indianapolis, IN (US)

(72) Inventors: Richard J. Walsh, Raleigh, NC (US); Michael D. Snyder, Noblesville, IN (US)

(73) Assignee: Interactive Intelligence Group, Inc., Indianapolis, IN (US)

(*) Notice: Subject to any disclaimer, the term of this patent is extended or adjusted under 35 U.S.C. 154(b) by 0 days.

(21) Appl. No.: 15/060,330

(22) Filed: Mar. 3, 2016

(51) Int. Cl.
*H04M 11/00* (2006.01)
*H04M 3/533* (2006.01)

(52) U.S. Cl.
CPC .................................. *H04M 3/533* (2013.01)

(58) Field of Classification Search
CPC .................................................. H04N 21/4882
See application file for complete search history.

(56) References Cited

U.S. PATENT DOCUMENTS

| | | | | |
|---|---|---|---|---|
| 7,676,473 B2 * | 3/2010 | Alperin | ............... | H04L 41/0806 707/999.01 |
| 8,078,476 B2 * | 12/2011 | Alperin | ............... | G06Q 10/109 705/1.1 |
| 8,086,223 B2 * | 12/2011 | Allen | ............... | H04M 1/642 455/412.1 |
| 8,145,196 B2 * | 3/2012 | Wood | ............... | H04M 1/2745 379/88.23 |
| 8,160,551 B2 * | 4/2012 | Hadinata | ............ | H04M 3/42348 455/413 |
| 8,170,189 B2 * | 5/2012 | Alperin | ............. | H04M 3/42263 370/352 |
| 8,184,780 B2 * | 5/2012 | Siminoff | ............ | H04M 3/53333 379/88.14 |
| 8,214,469 B2 * | 7/2012 | Alperin | ............. | G06F 17/30867 709/203 |
| 8,306,509 B2 * | 11/2012 | Sigmund | ................ | H04M 3/02 379/88.06 |
| 8,311,203 B2 * | 11/2012 | Wang | ................ | H04M 1/72583 379/209.01 |
| 8,320,535 B2 * | 11/2012 | Alperin | ................ | H04M 3/436 379/88.14 |
| 8,340,631 B2 * | 12/2012 | Mann | ................ | H04M 1/72519 379/210.01 |
| 8,447,274 B2 * | 5/2013 | Hadinata | ........... | H04M 3/53383 455/412.1 |
| 8,768,293 B1 * | 7/2014 | Weng | ..................... | H04M 11/04 379/210.01 |
| 8,798,238 B2 * | 8/2014 | Sigmund | ........... | H04M 3/42102 379/201.02 |
| 9,241,059 B2 * | 1/2016 | Scott | .................. | H04M 1/72519 |
| 9,276,775 B2 * | 3/2016 | Anantharaman | ....... | H04L 12/66 |
| 2004/0102186 A1 * | 5/2004 | Odinak | ............... | H04L 12/1822 455/416 |
| 2005/0089149 A1 | 4/2005 | Elias | | |
| 2006/0246878 A1 * | 11/2006 | Khoury | ............... | H04L 12/5855 455/412.2 |
| 2008/0055264 A1 * | 3/2008 | Anzures | .............. | G06F 3/04883 345/173 |
| 2008/0056459 A1 * | 3/2008 | Vallier | ..................... | H04L 12/58 379/88.12 |
| 2009/0154668 A1 * | 6/2009 | Hao | .................. | H04M 3/53325 379/88.18 |
| 2010/0091959 A1 * | 4/2010 | Miki | ................. | H04M 3/53333 379/88.17 |
| 2010/0151831 A1 * | 6/2010 | Hao | .................. | H04M 3/53325 455/412.2 |
| 2011/0034152 A1 * | 2/2011 | Khouri | ................ | H04M 3/5235 455/413 |
| 2011/0300833 A1 * | 12/2011 | Shaw | ................ | H04M 3/53333 455/413 |
| 2013/0101097 A1 * | 4/2013 | Shaw | .................. | H04M 1/7255 379/88.14 |
| 2013/0108032 A1 * | 5/2013 | Shaw | ...................... | H04W 4/16 379/88.14 |
| 2013/0122871 A1 * | 5/2013 | Shaw | ..................... | H04W 4/06 455/413 |
| 2013/0156167 A1 * | 6/2013 | Talwar | ............... | H04M 3/53325 379/88.12 |
| 2015/0256679 A1 * | 9/2015 | Burnett | ................. | H04M 3/533 379/88.12 |

* cited by examiner

*Primary Examiner* — Joseph T Phan
(74) *Attorney, Agent, or Firm* — Ice Miller LLP

(57) ABSTRACT

A system and method are presented for voicemail acceleration. A voicemail acceleration system, which functions to accelerate the experience of a user, is associated with at least one user device. A user may initiate an interaction with another user, wherein the device associated with the voicemail acceleration system detects that the interaction is being sent to voicemail through contact analysis. A pre-established message and/or a number of options may be presented to the user initiating the interaction, wherein the user may choose an option or elect to automatically leave a message and end the interaction on their end. The voicemail acceleration system provides the retrieved message to the other user and finishes the interaction.

17 Claims, 2 Drawing Sheets

SYSTEM AND METHOD FOR VOICEMAIL ACCELERATION

BACKGROUND

The present invention generally relates to telecommunications systems and methods, as well as voicemail systems. More particularly, the present invention pertains to the automated answering of communications.

SUMMARY

A system and method are presented for voicemail acceleration. A voicemail acceleration system, which functions to accelerate the experience of a user, is associated with at least one user device. A user may initiate an interaction with another user, wherein the device associated with the voicemail acceleration system detects that the interaction is being sent to voicemail through contact analysis. A pre-established message and/or a number of options may be presented to the user initiating the interaction, wherein the user may choose an option or elect to automatically leave a message and end the interaction on their end. The voicemail acceleration system provides the retrieved message to the other user and finishes the interaction.

In one embodiment, a method is provided for accelerating voicemail in a communications system wherein the system comprises at least an audio channel connecting a plurality of devices associated with a plurality of users and a voicemail acceleration system associated with a first user's device, the method comprising the steps of: providing, by the voicemail acceleration system, a plurality of options to the first user for selection, wherein the first user opts to leave a pre-established message to the second user; receiving a communication, by a device associated with a second user, from a device associated with a first user in the communication system via the audio channel, wherein the communication is handled by voicemail of a second user; detecting, by the voicemail acceleration system that voicemail of the second user is handling the communication; disconnecting, by the voicemail acceleration system, the device associated with the first user; retrieving, by the voicemail acceleration system, the pre-established message; detecting, by the voicemail acceleration system, a prompt to leave a message from the voicemail of the second user; providing, by the voicemail acceleration system, the retrieved message; and disconnecting, by the voicemail acceleration system, the communication to the second user.

In another embodiment, a method is provided for accelerating voicemail in a communications system wherein the system comprises at least an audio channel connecting a plurality of devices associated with a plurality of users, and a voicemail acceleration system associated with at least one user's device, the method comprising the steps of: receiving a communication from a first user of the plurality of users in the communications system, wherein the communication is handled by voicemail of a second user from the plurality of users; detecting, by the voicemail acceleration system, that voicemail is handling the communication; handling, by the voicemail acceleration system, the communication according to pre-determined instructions from the second user; disconnecting, by the voicemail acceleration system, the first user; retrieving, by the voicemail acceleration system, the pre-determined instructions from the second user and performing said pre-determined instructions; and disconnecting, by the voicemail acceleration system, the communication to the second user.

DETAILED DESCRIPTION

Figure 1:
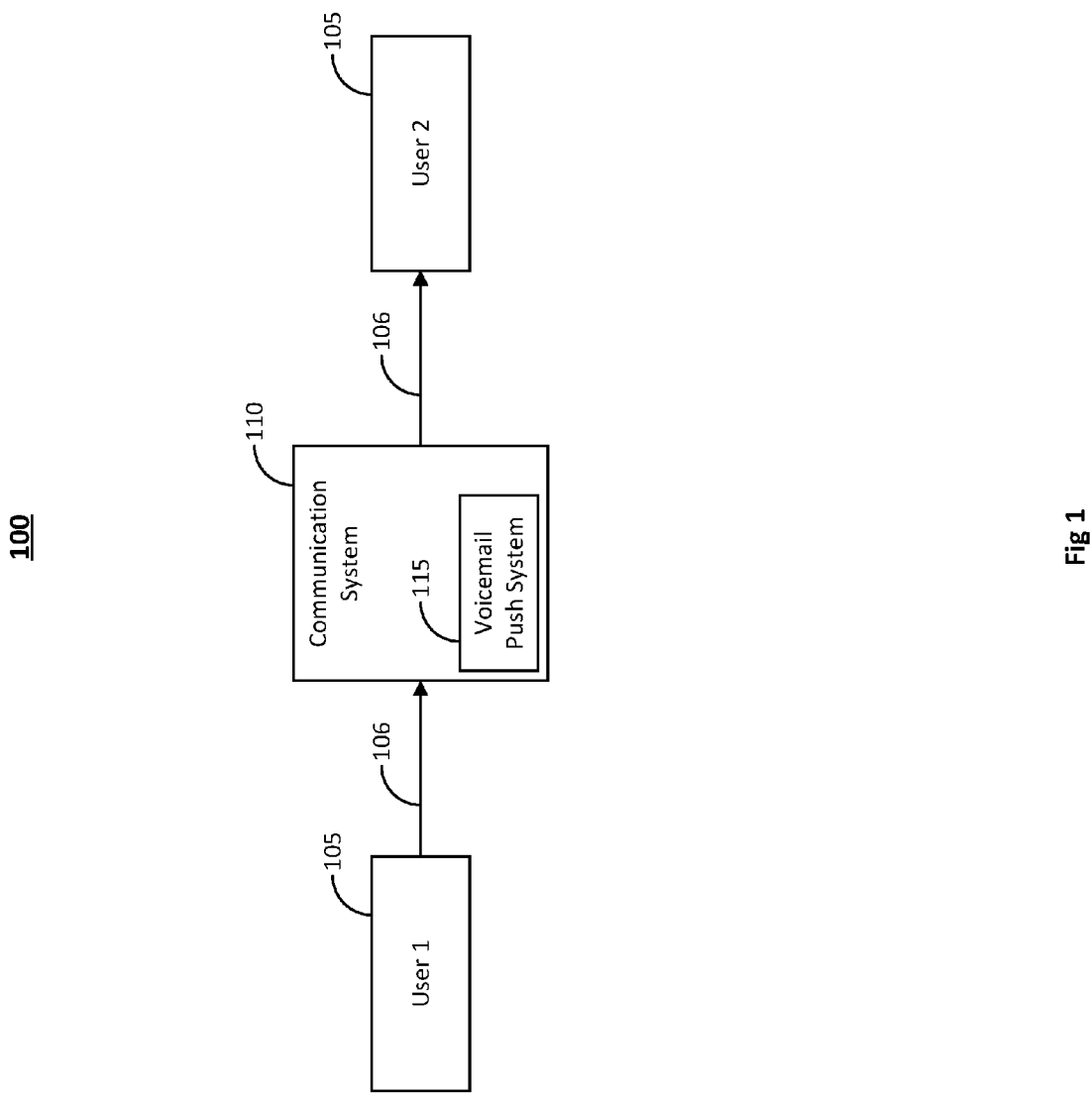
FIG. 1 is a diagram illustrating an embodiment of a system for voicemail acceleration.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A user initiating an interaction with a second user will have to wait until a prompt or the answering of the interaction, whether the answer is provided by the second user, through voicemail, or another means. Voicemail acceleration comprises a way to expedite the process of leaving a voicemail by a user, making an interaction more efficient for the communicant through the automation of steps that are more time consuming. A user is thus able to proactively remove themselves from part of the process.

In an embodiment, voicemail acceleration may be applied in a contact center environment. The acceleration of voicemail is distinct from an automated dialing campaign. Unlike an automated dialing campaign, the voicemail acceleration system is geared towards outbound communications with messages. In an embodiment, if a user wants to contact a number of other users, such as 10, for example, a message could be sent to each person. In an embodiment, a personal message may be geared towards an individual, whereas a dialer campaign does not allow for personalization. The messages are thus not according to a template, as they would be in a dialing campaign.

FIG. 1 illustrates an embodiment of a system for voicemail acceleration, indicated generally at 100. The system 100 might comprise a plurality of users 105 connected to a communication system 110 via an audio channel 106. While only two users are indicated for simplicity in FIG. 1, it is within the scope of the embodiments disclosed herein for there to be more than two users. The communication system 110 comprises at least a voicemail acceleration system 115 capable of communication with devices associated with the plurality of users 105. In an embodiment, each user 105 may have at least one device associated with them. The plurality of users 105 may have mobile telecommunication devices associated with them, which communicate with the system 110 via an audio channel. Other devices might comprise non-mobile telecommunication devices as well, such as a landline or an agent workstation within a contact center, for example. The communication system 110 is capable of performing communication analysis on the interactions. The voicemail acceleration system 115 is capable of utilizing the communication analysis for determining if voicemail has answered a communication. The communication analysis might comprise voice recognition or keyword recognition. Communication analysis may also be capable of detecting the means which has answered a communication for an outbound communication, such as a busy signal, a human, an answering machine, etc.

Figure 2:
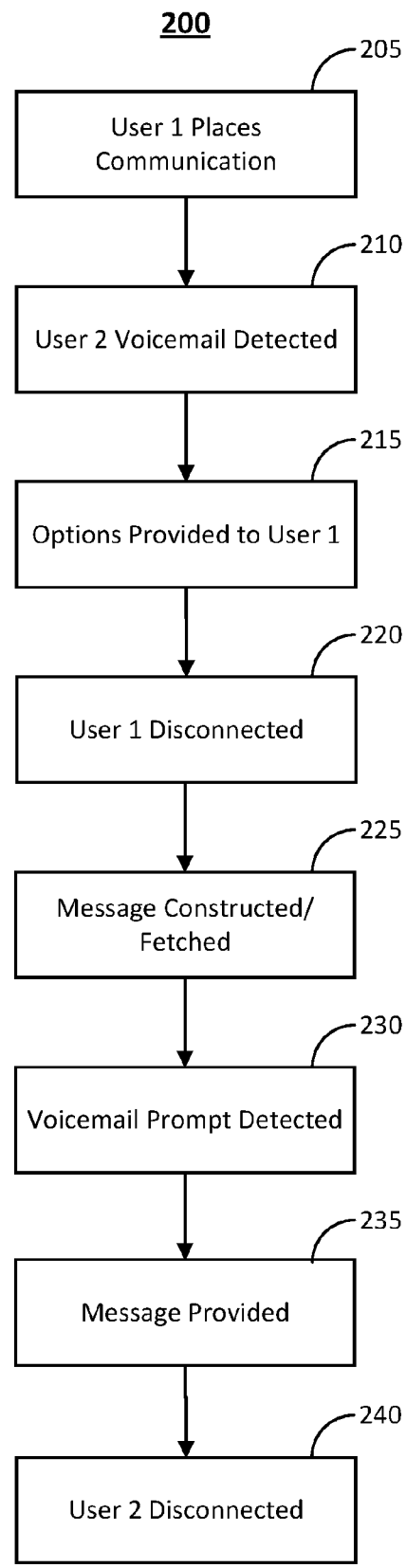
FIG. 2 is a flowchart illustrating an embodiment of a process for voicemail acceleration.

FIG. 2 is a flowchart illustrating an embodiment of a process for voicemail acceleration, which may occur in the voicemail acceleration system 115 shown in FIG. 1. The process 200 illustrates an embodiment of a single communication, however, the system 100 may also be capable of performing these steps independently for a plurality of different communications at the same time.

In operation 205, a first user places a communication to a second user. Examples of communications might comprise a call or a video chat. Each user is associated with a device such as a phone, a computer, or other mobile device capable of placing communications. At least one of the devices is able to communicate with the voicemail acceleration system. Control is passed to operation 210 and the process 200 continues.

In operation 210, the second user's voicemail is detected. For example, the detection of voicemail may occur via communication analysis. The communication analysis may comprise voice recognition or keyword recognition, for example, "please leave a message" may be detected and associated with a voicemail service or answering machine. The communication analysis is further capable of detecting the means which have answered the communication for an outbound communication, such as a busy signal, a human, answering machine, etc. In an embodiment, the communication will go to voicemail or it is determined that the second user has not answered the communication. For example, the determination that the second user has not answered the communication might be based on the number of rings or the length of the communication. The system may decide that voicemail is detected if the number of rings or the length of the communication exceeds a threshold. Control is passed to operation 215 and process 200 continues.

In operation 215, options may be provided to the first user. For example, a plurality of options may be provided by the voicemail acceleration system to the first user. An option may include to leave a pre-established message for the second user. In one embodiment, the options may be provided as an interactive voice response (IVR) system. The first user may be provided with the IVR audio, which may be overlaid onto the existing audio for the communication. The existing audio may have a lowered audio volume. In another embodiment, options may be provided to a first user's device such that the device produces a graphical interface to support those options, such as with a smartphone or a tablet, to name some non-limiting examples.

In another embodiment, a pre-established preference may be set as opposed to making a choice. For example, the first user's pre-established preference may be to leave a specific pre-established message. The first user may thus be prompted as to whether they would like to select their default or chose to be provide the full set of options. The pre-stablished preferences might include conditions which identify an option. Conditions may specify contextual information about the first user's communication, that when true, lead to the automatic selection of a specific option. For example, the first user may have a preference including a condition with a list of contacts and a specific pre-established message for those contacts. In another example, the preference might have a condition that indicates a 1-800 number does not receive a message.

The pre-established message might comprise an audio recording, a text indication that has been translated to audio, etc. Contextual information may include, to name some non-limiting examples, the number called, a SIP address, identifying information about the second user, quality of service, time of interaction, length of interaction, etc.

The user ending the interaction and letting it pass through may decide the message. In another embodiment, the user which ends the interaction may just hang up or elect to automatically send a message to the user with disconnection, removing the need for action from the first user. Control is passed to operation 220 and operation 200 continues.

In operation 220, the first user is disconnected. For example, the voicemail acceleration system may disconnect the first user from the system. Control is passed to operation 225 and the process 200 continues.

In operation 225, a message is constructed. For example, the voicemail acceleration system may provide the message selected by the first user for delivery to the second user. Control is passed to operation 230 and process 200 continues.

In operation 230, a voicemail prompt is detected. For example, the voicemail acceleration system may detect the voicemail prompt audio/tone, which may act as a signal to leave a message. Control is passed to operation 235 and process 200 continues.

In operation 235, a message is provided. For example, the voicemail acceleration system provides the message. Control is passed to operation 240 and the process 200 continues.

In operation 240, the second user is disconnected by the voicemail acceleration system and the process ends.

In an embodiment, after the first user has placed a communication, the first user may hear "please leave a voicemail", or otherwise decide that the second user is not going to pick up (such as the communication ringing longer than usual). Instead of waiting on the line for the voicemail acceleration system for a prompt, the first user may use their communication device to tell the acceleration system to use a pre-established message, where the first user has proactively removed themselves from having to wait on the system and being prompted. The remainder of the process is completed after the first user has selected the pre-established message.

In yet another embodiment, the voicemail acceleration system could reside on the first user's communication device, one or more communication devices between a plurality of users, and/or a second user's communication device. If the devices exchange compatibility information, the voicemail acceleration system may delegate the message construction/fetching of the message, detecting voicemail prompts, providing a message, and disconnecting the communication to one or more of contributing devices to end the communication as soon as possible. Thus, the first user's device can stop participating in the process as soon as possible, leaving the system to finish the process automatically.

In yet another embodiment, the second user may not be in a place where they can timely answer the communication and be provided the audio message while it is being selected. In this embodiment, if the system detected a second user's voice, the system could provide the second user with a dynamic IVR system which informs the second user that a first user is in the process of leaving a message. Thus, the second user may select options from the IVR to listen to the message, auto-callback the first user, etc.

In yet another embodiment, the first user may not want to talk to the second user and may just leave a voicemail message (e.g., a voice chat, audio message, audio/video message, etc.) without interrupting the second user.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for accelerating voicemail in a communications system wherein the system comprises at least an audio channel connecting a plurality of devices associated with a plurality of users and a voicemail acceleration system associated with a first user's device, the method comprising the steps of:
    a. providing, by the voicemail acceleration system, a plurality of options to the first user for selection, wherein the first user opts to leave a pre-established message to the second user;
    b. receiving a communication, by a device associated with a second user, from a device associated with a first user in the communication system via the audio channel, wherein the communication is handled by voicemail of a second user;
    c. detecting, by the voicemail acceleration system that voicemail of the second user is handling the communication;
    d. disconnecting, by the voicemail acceleration system, the device associated with the first user;
    e. retrieving, by the voicemail acceleration system, the pre-established message;
    f. detecting, by the voicemail acceleration system, a prompt to leave a message from the voicemail of the second user;
    g. providing, by the voicemail acceleration system, the retrieved message; and
    h. disconnecting, by the voicemail acceleration system, the communication to the second user.

2. The method of claim 1, wherein the communication is a call.

3. The method of claim 1, wherein the communication is a video chat.

4. The method of claim 1, wherein the detecting comprises word recognition.

5. The method of claim 1, wherein the detecting comprises voice recognition.

6. The method of claim 1, wherein the pre-established message is retrieved from a database associated with the voicemail acceleration system.

7. The method of claim 1, wherein the prompt to leave a message comprises a signal.

8. A method for accelerating voicemail in a communications system wherein the system comprises at least an audio channel connecting a plurality of devices associated with a plurality of users, and a voicemail acceleration system associated with at least one user's device, the method comprising the steps of:
    a. receiving a communication from a first user of the plurality of users in the communications system, wherein the communication is handled by voicemail of a second user from the plurality of users;
    b. detecting, by the voicemail acceleration system, that voicemail is handling the communication;
    c. handling, by the voicemail acceleration system, the communication according to pre-determined instructions from the second user;
    d. disconnecting, by the voicemail acceleration system, the first user;
    e. retrieving, by the voicemail acceleration system, the pre-determined instructions from the second user and performing said pre-determined instructions; and
    f. disconnecting, by the voicemail acceleration system, the communication to the second user.

9. The method of claim 6, wherein the pre-determined instructions from the second user comprise providing, by the voicemail acceleration system, a retrieved message to the second user that has been previously selected by the second user.

10. The method of claim 8, wherein the communication is a call.

11. The method of claim 8, wherein the communication is a video chat.

12. The method of claim 8, wherein the detecting comprises word recognition.

13. The method of claim 8, wherein the detecting comprises voice recognition.

14. The method of claim 8, wherein the pre-established message is retrieved from a database associated with the voicemail acceleration system.

15. The method of claim 8, wherein the prompt to leave a message comprises a signal.

16. The method of claim 8, wherein the detecting comprises passage of a pre-determined length of time after initiation of the communication with no resolution.

17. The method of claim 8, wherein the detecting comprises a predetermined number of rings after initiation of the communication with no resolution.

* * * * *